United States Patent [19]

Guggemos et al.

[11] 4,223,861
[45] Sep. 23, 1980

[54] ADJUSTABLE HANGER FOR ELONGATED WALL MOUNTED MEMBERS

[75] Inventors: Kenneth F. Guggemos; Arthur R. Guggemos, both of Winsted, Minn.

[73] Assignee: Sterner Lighting Systems Incorporated, Winsted, Minn.

[21] Appl. No.: 856,910

[22] Filed: Dec. 2, 1977

[51] Int. Cl.² .................................................. F16M 13/00
[52] U.S. Cl. ................................. 248/222.3; 248/251; 403/167
[58] Field of Search ................ 248/73, 222.2, 222.3, 248/239, 251, 274; 403/167, 168

[56] References Cited

U.S. PATENT DOCUMENTS

| | | | |
|---|---|---|---|
| 909,769 | 1/1909 | Downing et al. | 248/317 X |
| 948,095 | 2/1910 | Hutton | 248/317 X |
| 1,197,052 | 9/1916 | Newhall | 248/317 X |
| 1,428,746 | 9/1922 | Blunt | 248/251 |
| 2,329,243 | 9/1943 | Biller | 248/343 |
| 2,886,278 | 5/1959 | Opie | 248/274 X |
| 2,896,899 | 7/1959 | Ronan | 248/251 |
| 2,943,137 | 6/1960 | Van Wyngarden | 248/343 X |
| 2,967,692 | 1/1961 | Wolar | 248/343 |
| 3,825,299 | 7/1974 | Bartlett | 248/251 X |

FOREIGN PATENT DOCUMENTS 1429553 11/1968 Fed. Rep. of Germany ........... 248/495

Primary Examiner—William H. Schultz
Attorney, Agent, or Firm—Kinney, Lange, Braddock, Westman and Fairbairn

[57] ABSTRACT

A hanger for mounting elongated members relative to a wall surface which permits alignment of the elongated member in a direction perpendicular to the surface, and also in both directions along the surface. The uses of the hangers find particular application in hanging elongated fluorescent light troffers or mounting tubes, and for mounting other devices such as a lighted hand rail or an unlighted hand rail for stairways.

17 Claims, 14 Drawing Figures

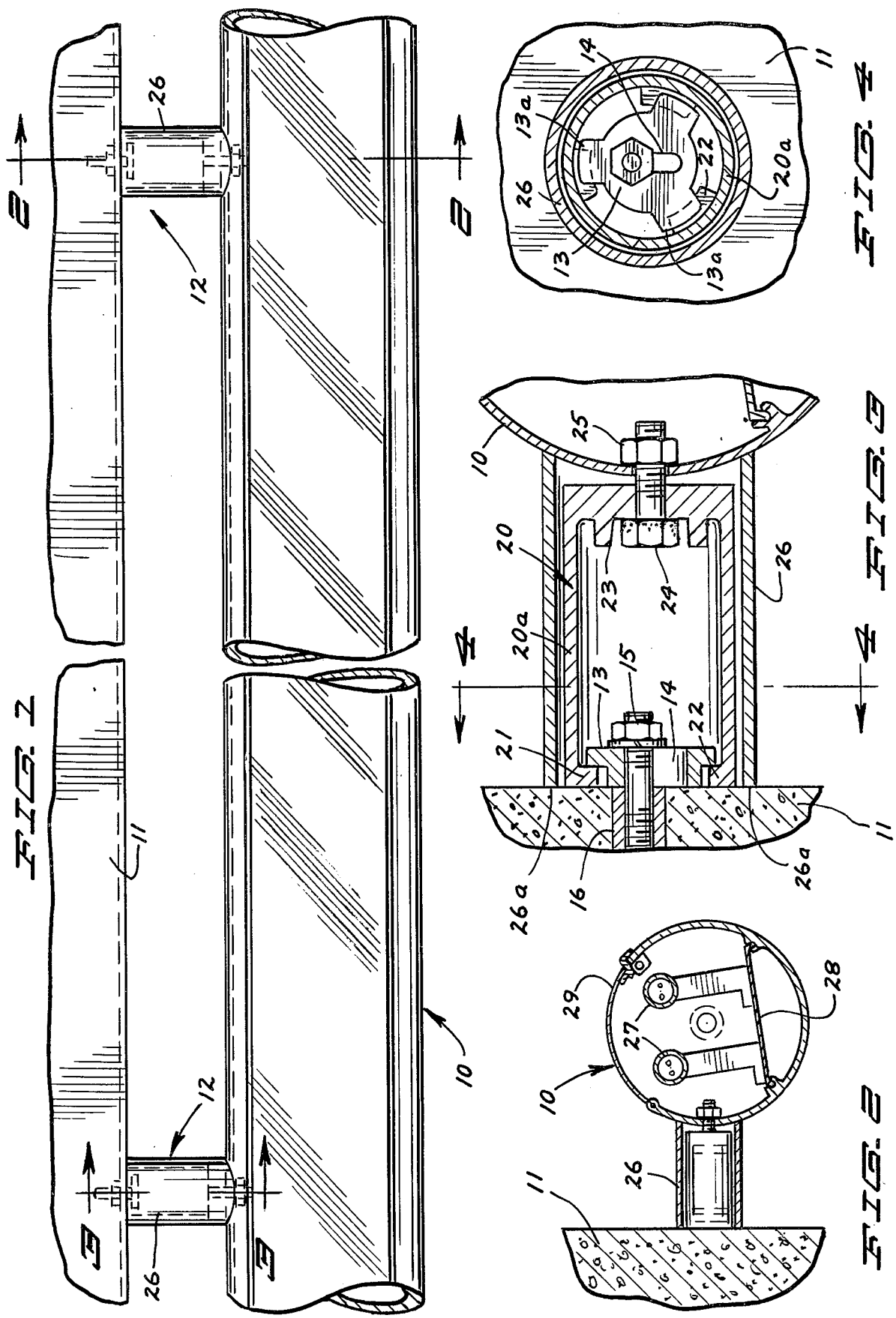

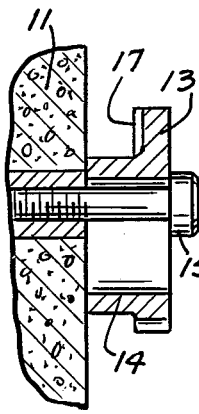
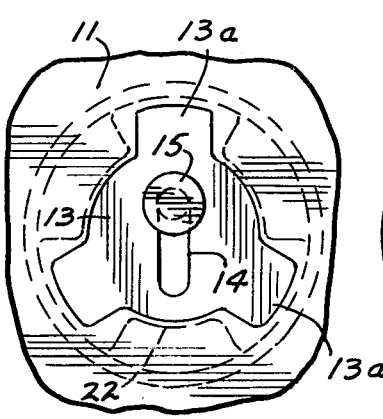
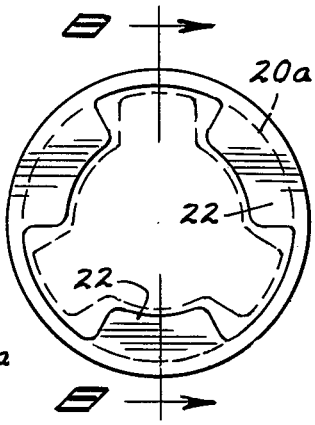
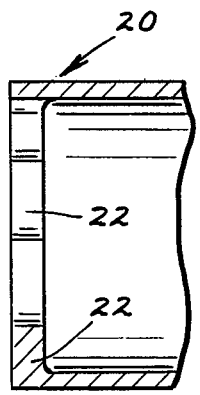
FIG. 5    FIG. 6    FIG. 7    FIG. 8
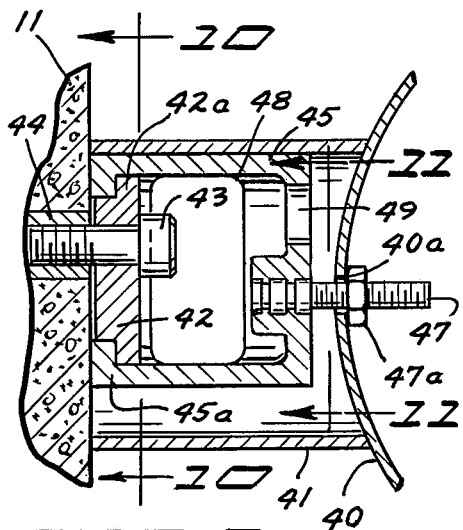
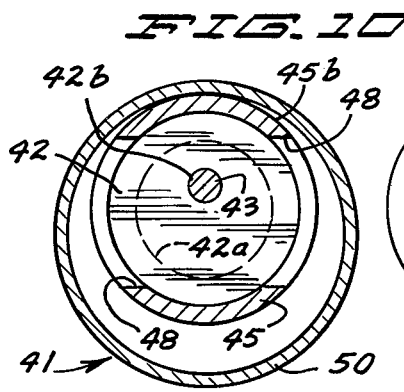
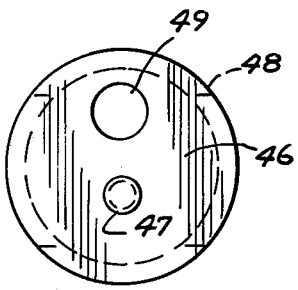
FIG. 9    FIG. 10    FIG. 11
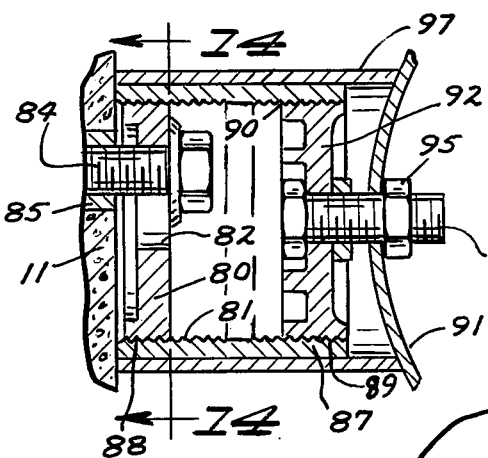
FIG. 13
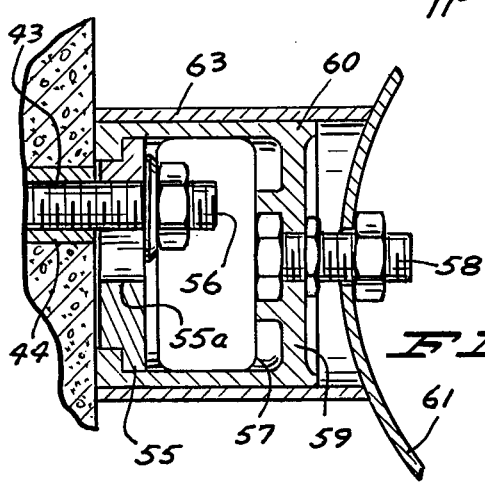
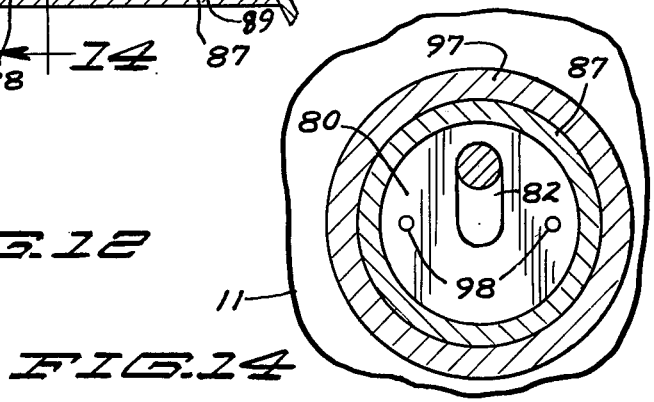
FIG. 12    FIG. 14

ADJUSTABLE HANGER FOR ELONGATED WALL MOUNTED MEMBERS

BACKGROUND OF THE INVENTION

1. Field of the Invention

The present invention relates to adjustable hangers that permits adjusting a mounting point for elongated members in three different mutually perpendicular directions.

2. Prior Art

Various hangers for lighting fixtures or support devices for fixtures have been advanced. Devices that fasten into a wall includes items shown in U.S. Pat. Nos. 909,769 and 948,095. U.S. Pat. No. 2,967,692 illustrates a ceiling fixture support which has a slotted adjustment member that adjusts the support in a plane parallel to the ceiling, and does permit adjustment in two directions within this plane. U.S. Pat. No. 2,329,243 shows a type of eccentric washer that can be rotated for providing adjustment for improperly located mounting holes for a mounting screw. This also shows adjustment in directions along the plane of a wall on which the members are to be mounted.

U.S. Pat. No. 1,197,052 also shows a wall mounting stud or bolt which has a fixture securing means that is adjustable. Another example of a hanger device is shown in U.S. Pat. No. 2,943,137.

SUMMARY OF THE INVENTION

The present invention relates to hanger units for elongated members that have to be supported at two or more spaced points and spaced outwardly from a surface such as a supporting wall or other hanger apparatus, in which there is a provision for adjustment to insure proper alignment of the connections between the wall and the elongated member in three mutually perpendicular directions. Two of the directions lie generally in the plane of the wall or the supporting surface, and the other direction of adjustment is perpendicular to the wall surface.

Further, the device of this invention provides a unique way of obtaining rapid, and quick connection for adjustable devices where the device permits adjustment in two directions in a plane for alignment purposes, and where the in and out alignment is not critical.

In one form of the invention, a twist lock connector member is attached in a fixed position to a supporting wall, and an outer support housing can be twist locked into place and held securely. The housing can carry a stud or bolt for mounting the elongated member and by providing either a slotted, or an eccentric mounting connector member, adjustment in two directions in the plane of the wall can be achieved.

In and out adjustment is achieved by using a separate sleeve that slips over the hanger unit mounting member and can be trimmed to length to provide the in and out adjustment and thereafter the elongated member can be bolted solidly to the supporting unit and retained in position spaced from the wall.

The hanger unit is relatively simple to mass produce by casting or other known techniques and permits on-site adjustment across a wide range of variances in location of mounting inserts that are normally placed into a concrete wall, for example when the wall is formed.

BRIEF DESCRIPTION OF THE DRAWINGS

FIG. 1 is a top plan view of a typical installation showing a part of the length of an elongated member having two hanger units made according to the present invention installed thereon and shown in position holding a fluorescent troffer;

FIG. 2 is a sectional view taken as on line 2—2 in FIG. 1;

FIG. 3 is an enlarged sectional view taken as on line 3—3 in FIG. 1;

FIG. 4 is a sectional view taken as on line 4—4 in FIG. 3;

FIG. 5 is a cross sectional view showing the hanger unit mounting member in place on a wall, in greater detail, with parts removed;

FIG. 6 is an end view of the mounting member of FIG. 5 with the outline of a twist lock outer support member shown in dotted lines in a position for attachment thereto;

FIG. 7 is an end view of a twist lock outer support member as shown in FIG. 3 with the outline of the mounting member being shown in dotted lines;

FIG. 8 is a fragmentary sectional view taken on line 8—8 in FIG. 7 of the lock end portion of the twist lock outer support member;

FIG. 9 is a vertical sectional view similar to that of FIG. 3 showing a second embodiment of the present invention;

FIG. 10 is a sectional view taken as in line 10—10 of FIG. 9;

FIG. 11 is a sectional view taken as in line 11—11 of FIG. 9; and

FIG. 12 is a vertical sectional view of a third embodiment of the present invention;

FIG. 13 is a vertical sectional view of a fourth embodiment of the invention; and FIG. 14 is a sectional view as in line 14—14 of FIG. 13.

DESCRIPTION OF THE PREFERRED EMBODIMENT

An elongated member to be supported indicated generally at 10, in this particular instance comprises a tubular member in the form of a fluorescent troffer or support for fluorescent light tubes. This elongated member is supported with respect to a wall 11 at two or more substantially spaced points, and the wall can be a concrete wall having present screw anchors in the wall for mounting such an elongated member. The spacing of the screw anchors is generally not very precise, and will vary greatly. Thus, it is necessary, because the troffer is a rigid member and the attachment holes or openings on the troffer are fixed in location, to provide for an adjustment in the plane of the wall in both directions so that alignment of the supporting studs for the elongated member can be achieved by adjustable devices. Further, in and out spacing relative to the wall should be adjustable because the wall may not be completely planar, but can have dips or protrusions that would make the spacing vary between attachment points while, of course, the rigid tube or troffer would not conform to the undulations of the wall.

A suitable adjustable attaching member or hanger unit indicated generally at 12 is utilized in the first embodiment of the invention. The adjustment member 12 as can be seen in FIGS. 2-4, generally comprises a twist lock mounting plate (clamp member) 13 that in this form of the invention has a slotted opening 14 in the center thereof that is elongated in a direction parallel to the wall, and is held relative to the wall in a fixed location through the use of a cap screw (fastener member) 15. The cap screw in turn is threadably mounted into a cap screw anchor 16 that is anchored in the wall. The plate 13 in this form of the invention has three twist lock ears 13a spaced 120° apart and extending outwardly of the central portion thereof, and the twist lock ears have tapered surfaces 17a at the rear side thereof (side adjacent the wall) so that they form cam surfaces that taper inwardly toward the wall in clockwise direction as is shown in FIG. 4.

A support housing indicated generally at 20 as shown is generally tubular, but has a first twist lock end wall 21, that provides three ears 22 that extend radially inwardly of the tubular wall 20a and are spaced to be passed between ears 17 to be located between ears 13a and wall 11. Thus the ears 22 provide an opening in the first end of the housing of a size to have ears 13a moved therethrough and thereafter the housing twisted so that the housing is cammed inwardly toward the wall so that the clamp member 13 clamps it against the wall. The opposite end of the housing indicated at 23 supports a cap screw or stud 24 that in turn protrudes axially away from the housing and the wall 11 and can pass through an aperture in the troffer or tube 10 which comprises the elongated member to be supported. Normally tube 10 will have some access so that a nut 25 can be threaded over the bolt or stud 24, and the troffer securely held or tightened down.

In order to provide for adjustment of distance between the surface of the wall 11 and the elongated member 10, a sleeve 26 that surrounds the housing 20 and is of a greater axial length than the housing is positioned over the housing 20 and is trimmed in length at its base end, indicated at 26a, so that the in and out position of the tube or elongated member 10 can be precisely arranged after the wall has been erected and the mounting member and housing have been initially placed in position. After the sleeve has been trimmed and the mounting bolt 24 extended through the troffer aperture, nut 25 is threaded onto the bolt.

Referring to FIG. 2, it can be seen that the elongated member 10 in this form is a fluorescent troffer including fluorescent light tubes 27, mounted on a support 28 that is held in a suitable manner. A suitable cover indicated at 29 also can be utilized in this device and this case would be transparent so that light could pass through the cover.

FIG. 1 illustrates the in and out adjustment as well, where the sleeve can be trimmed to fit the existing wall, merely by cutting off the base end of the sleeve 26 shown there, and as shown the end fitting against the tube 10 can be cut into a curved shape so that the fit is tight. Then the nut 25 can be tightened down securely to insure that the troffer 10 is held in place with the sleeve held firmly in position between wall 11 and member 10.

FIGS. 5 and 7 illustrate clamp member 13, with the cam surface of ear 17 being indicated at 17 in FIG. 5. The adjustment through the use of the slot 14 can be in any direction in the plane of the wall. In other words, by rotating the ear 13a slightly, and sliding the support 13 relative to the stud 15, the hanger unit can be adjusted into any desired position in a plane parallel to the wall.

Shown in dotted lines in FIG. 6 are the ears 22 formed in one end wall of the housing 20. As can be seen the ears 22 will fit between the ears 17, and wall 11 and then by rotating the housing clockwise, the ears 22 will slip against the cam surface 17 and be held in position by the ears 13a.

The housing can be provided with access openings, if desired, for tightening the cap screw 15 into place, merely by removing portions of the tubular wall or opposite end wall of the housing 20, as shown at 20b in FIG. 4.

In the second embodiment, an elongated member 40 is supported relative to the wall 11, through the use of a modified hanger unit, generally designated 41. In this case, a mounting plate or clamp member 42 is attached to the wall, through the use of a cap screw 43 which is threaded into a screw anchor 44 in the wall. The clamp member 42 is a washer type support that has a radially outer circular flange 42a to provide a continuous annular shoulder whereby an annular space is defined between the surface of the wall 11 and the axial inner surface of the flange. The shoulder can be tapered slightly radially inwardly in an axial direction toward the wall to permit tightening the housing 45 which as shown is partially tubular, against the wall 11 to securely fasten the housing in position. In this particular instance, it can be seen that the circular opening 42b for the cap screw 43 in the washer 42 is eccentric with respect to the center axis of the washer so that by rotating the washer about the cap screw, the outer periphery of the washer and the flange 42a will be arranged in a different location relative to the center axis of cap screw 43 to provide for adjustment in two different directions in the plane of the wall.

Housing 45 in this form of the invention has an inner annular flange 45a at one end thereof which fits under the flange 42a, and at the other end, the end wall 46 thereof is provided with a stud 47 that protrudes outwardly from the housing tubular wall and end wall 26. Stud 47 in turn is eccentric with respect to the longitudinal central axis of the housing 45 so that when the housing is rotated about its central axis with respect to the washer 42, the amount of offset of the stud 47 from the central axis of the cap screw 43 will be varied to provide for an additional adjustment to align the stud with the opening 40a that is shown in the tube 40.

The housing 45 can also be provided with side openings 48 on opposite sides of the tubular wall 45b thereof which are of sufficient size so that the washer 42 can be slid into position inside the housing when the unit is to be assembled, i.e. each opening 48 being of a size to have washer 42 inserted therethrough. An opening 49 can be provided in the end wall 46 for tightening down the cap screw 43, or the cap screw 43 also can be made accessible from the openings 48.

A sleeve 50 in this form of the invention is of a substantially larger diameter than the housing 45, so that the eccentricity of the housing relative the central axis of cap screw 43 does not cause interference with the interior of the sleeve 50. The sleeve 50 is used for adjusting the distance of the tube from the support wall, as previously explained relative sleeve 26, but in this instance it would center or assume its desired position relative to the housing 45 regardless of the fact that the housing 45 may be in a position where the stud 47 is off center from the center line of the sleeve.

Thus, in the second embodiment of the invention, the same concept of using an attachment member, a housing held by the mounting plate relative to the wall which can be adjusted in two directions in the plane of the wall, and a sleeve that can be adjusted in length for permitting positioning relative to the wall surface are shown in combination. Stud 47, of course, can have a nut 47a threaded on to the stud for holding the tube or elongated member 40 in a position abutting against the sleeve.

A third embodiment of the invention is shown in FIG. 12, and in this form of the invention, a clamp member or washer 55 which is constructed substantially similar to the washer 42 is utilized, except that a slot 55a that is elongated in a plane parallel to the wall is formed in the washer. The mounting member 55 can be held in place with a cap screw 43 as previously explained, and held relative to the wall 11 with a suitable screw anchor 44. The cap screw (fastener member) 56 can be of any desired form, and access openings 57 will also be provided in the housing 60 for permitting the washer 55 to be inserted into the housing.

A stud 58 is positioned in an outer end wall 59 of the housing 60 to extend through an aperture in tube 61 and this will hold the tube (elongated member) 61 in the normal position when a nut is threaded on the stud. In this form of of the invention, the stud 58 is centered on the central axis of the housing, and the slot and the washer 55 provides for adjustment in two directions in the plane of the wall. Again, here a sleeve 63 is utilized to provide for an adjustment for the spacing between the tube 61 and the surface of the wall 11, and by trimming the sleeve 63 to the desired length after the tube mounting unit has been properly positioned.

A fourth embodiment of the invention is shown in FIGS. 13 and 14, and in this form of the invention a mounting member 80 is utilized. The mounting member 80 is cylindrical and has an exterior threaded wall 81. Further member 80 has a slot 82 extended therethrough that is elongated in a plane parallel to the wall 11. The mounting member can be held in place with a cap screw (fastener member) 84 threaded into a suitable screw anchor 85 that is mounted by the wall 11.

An annular housing 87 of a substantially greater axial length than the mounting member is provided at one end portion with internal threads 88 that form a mating fit with threads 81. The opposite end portion of the housing is provided with internal threads 89 that form a mating fit with the threads 90 of a plug 92 for mounting the plug on the housing.

A stud 94 is mounted by the plug to extend through an aperture in tube (elongated member) 91 and this will hold the elongated member in the normal position when a nut 95 is threaded on the stud. The stud is centered on the central axis of the housing to extend outwardly thereof in a direction away from the mounting member 80. A sleeve 97 of a diameter to slip over the housing and of a greater axial length than the housing is utilized to provide for an adjustment between the elongated member 91 and the surface of the wall, the one end of the tube being cut to form a mating fit with the elongated member as described with reference to previously described embodiments.

In use of the fourth embodiment the fastener 84 is extended through slot 82 and threaded into anchor 85. The housing 87 may be threaded onto the mounting member either before or after the fastener is extended through the slot 82, the mounting member being provided with two holes 98 to accept a spanner wrench to permit turning the mounting member relative the housing. Before tightening the screw 84, an aligner tool (not shown) that includes a cylindrical portion which may be slid into threaded portion 89 and a pointer that extends axially outwardly of the cylindrical portion about the same distance the stud extends outwardly of plug 92 is slid into the housing with the pointer adjacent a string line that extends along the mounting apertures of the elongated member. Now the housing and mounting member are rotated about cap screw 84 and/or are moved to vary the position of the cap screw relative the length of the slot 82 until the pointer's pointed end is aligned with the string-line.

While the housing is retained in this adjusted position the alignment tool is removed and the cap screw is tightened. Thereafter the plug is threaded into the housing and the elongated member secured to the stud 94 in the manner previously indicated. The exterior surface of the plug may be provided with holes such as holes 98 for accepting a spanner wrench for turning the plug relative to the housing.

The cap screws, mounting bolts or studs can be hollow, if desired, to permit wiring to be passed through the studs into the interior of the tubular member that is being supported, for powering lights or other units that might be positioned into such tubes. Also, in place of a screw anchor and cap screw, a bolt can be extended through the wall or supporting wall for mounting the clamp member thereon without the use of a screw anchor.

What is claimed is:

1. In combination with an elongated member and a support wall or other supporting structure, apparatus for mounting the elongated member on the wall comprising a support member having a first end portion and an opposite second end portion, means for clamping the first end portion to the wall in various selected adjusted positions relative the wall in directions at right angles relative to one another in the plane of the wall, a mounting bolt mounted by the second end portion to extend outwardly thereof in a direction away from the first end portion, and a spacer sleeve abutting against the wall and the elongated member to have the support member extend thereinto and to space the elongated member the desired distance from the wall, the spacer sleeve being of a greater length than the spacing of said end portions.

2. The apparatus of claim 1 further characterized in that the first end portion has an opening therethrough and that the clamping means includes a clamp member having an opening therethrough and a fastener member extended through said openings for mounting the clamp member on the wall with the clamp member clampingly engaging said first end portion.

3. The apparatus of claim 2 further characterized in that the clamp member is circular and has its opening extending axially therethrough, and that the clamp member opening is elongated in a direction parallel to the wall to permit adjustment of the clamp member relative the fastener member by arcuate movement therearound and moving the clamp member relative the fastener member in the direction of elongation of the clamp member opening.

4. The apparatus of claim 2 further characterized in that the clamp member is circular and has a central axis and that the clamp member opening has a central axis that is radially offset from the first mentioned central axis.

5. The apparatus of claim 3 further characterized in that the clamp member has a central portion and at least one ear extending outwardly of the central portion in a direction parallel to the wall and that the support member opening is of a size and shape to have the clamp member extended therethrough and that upon twisting the support member when the support member first end portion is between clamp member ear and the wall the clamp member clampingly holds the support member against the wall.

6. The apparatus of claim 5 further characterized in that the clamp member opening is a slot that is elongated in a direction parallel to the wall to permit adjustment of the clamp member relative the fastener member in said direction and also angularly about the fastener member.

7. In combination with an elongated member and a support wall or other supporting structure, apparatus for mounting the elongated member on the wall comprising a tubular support member having a first end wall joined to the tubular support member and an opposite second end wall joined to the tubular support member and a central axis extending through the first and second end walls, means for clamping the first end wall to the support wall in various selected adjusted positions relative the support wall in directions at right angles relative to one another in the plane of the support wall, a mounting fastener mounted by the second end wall to extend outwardly thereof in a direction away from the first end wall and a spacer sleeve abutting against the support wall and the elongated member to have the tubular support member extend thereinto and to space the elongated member the desired distance from the support wall, the spacer sleeve being of a greater length than the spacing of said first and second end walls.

8. The apparatus of claim 7 further characterized in that the mounting fastener is offset from said central axis.

9. The apparatus of claim 7 further characterized in that the clamping means comprises a clamp member having a central axis generally perpendicular to the plane of the wall and an opening therethrough that is offset from its central axis, and a fastener member extended through the clamp member opening for mounting the clamp member on the support wall in various selected angular adjusted positions.

10. The apparatus of claim 7 further characterized in that the tubular member first wall has an opening therethrough and that the clamping means includes a clamp member in the tubular member and having a shoulder facing toward the tubular member first wall in abutting relationship therewith and a fastener member extended through the wall opening for mounting the clamp member on the support wall.

11. The apparatus of claim 10 further characterized in that the tubular member first wall comprises spaced apart ears extending inwardly of the tubular member toward one another, and that the clamp member has a central portion and spaced apart ears having said shoulder and being insertable through the tubular member first wall opening, at least the ears of one of the clamp member and the tubular member first wall having camming surfaces to more tightly clampingly retain the tubular member on the support wall as the tubular member is rotated in one direction relative the clamp member with the ears of the tubular member abutting against the clamp member ears.

12. The apparatus of claim 10 further characterized in that the shoulder is annular and that the tubular member has an opening of a size for having the clamp member inserted therethrough.

13. In combination with an elongated member and a support wall or other supporting structure, apparatus for mounting the elongated member on the wall comprising a housing having a first end and a second end, a fastener adapted for being mounted by the wall, means for being mounted by the fastener and mounting the housing in various selected adjusted positions relative the fastener, stud means mounted by the housing second end and extending more remote therefrom than the housing first end for mounting the elongated member, and a tubular member of a greater length than the housing to extend over the housing for spacing an elongated member from a support wall, said housing first end having a plurality of circumferentially spaced radially extending ears and an opening that is in part defined by said ears, and said means for being mounted by the fastener being of a size and shape to pass through the housing first end opening and having a central portion and a plurality of circumferentially spaced ears that are joined to the central portion and are movable into overlapping relationship to the housing ears by twisting the housing relative the means for being mounted by the fastener.

14. The apparatus of claim 13 further characterized in that the means for being mounted by the fastener has a fastener slot extended therethrough that is elongated in a direction perpendicular to the direction the fastener extends therethrough to permit selected adjustment angularly and in the direction of elongation of the slot with reference to the fastener when it is extended through the slot.

15. The apparatus of claim 1 further characterized in that the housing first end portion and the means for clamping the first end portion to the wall have mating threads for attaching one to the other.

16. The apparatus of claim 1 wherein said means for clamping includes a fastener, and wherein said support member has an opening between the first end portion and the second end portion of said housing sufficient to permit access to the fastener with a support member mounted on the means for clamping.

17. In combination with an elongated member and a support wall or other supporting structure, apparatus for mounting the elongated member on the wall comprising a tubular support member having a first end wall threadably joined to the tubular support member and an opposite second end wall joined to the tubular support member and a central axis extending through the first and second end walls, means for clamping the first end wall to the support wall including an elongated slot to permit moving the first end wall to various selected adjusted positions relative the support wall in the plane of the support wall, a threadable mounting fastener mounted by the second end wall to extend outwardly thereof in a direction away from the first end wall to support the elongated member and including means to threadably fasten the elongated member to the mounting fastener, and a spacer sleeve surrounding the tubular support member and being of length to abut against both the support wall and the elongated member when the mounting fastener is supporting the elongated member.

* * * * *